United States Patent
Liu et al.

(10) Patent No.: US 9,635,677 B1
(45) Date of Patent: Apr. 25, 2017

(54) DYNAMIC LINK ADAPTATION FOR IMPROVED LINK MARGIN

(71) Applicant: Apple Inc., Cupertino, CA (US)

(72) Inventors: Hsin-Yuo Liu, Fremont, CA (US);
Peter M. Agboh, San Francisco, CA (US); Indranil S. Sen, Fremont, CA (US); Xi Yang, Saratoga, CA (US); Chia Yiaw Chong, San Jose, CA (US); Mohit Narang, San Jose, CA (US); Ruben Caballero, San Jose, CA (US)

(73) Assignee: Apple Inc., Cupertino, CA (US)

( * ) Notice: Subject to any disclaimer, the term of this patent is extended or adjusted under 35 U.S.C. 154(b) by 33 days.

(21) Appl. No.: 14/656,347

(22) Filed: Mar. 12, 2015

Related U.S. Application Data

(60) Provisional application No. 61/953,591, filed on Mar. 14, 2014.

(51) Int. Cl.
*H04L 12/28* (2006.01)
*H04W 72/08* (2009.01)
*H04W 24/08* (2009.01)
*H04L 1/20* (2006.01)
(Continued)

(52) U.S. Cl.
CPC ......... *H04W 72/085* (2013.01); *H04L 1/0036* (2013.01); *H04L 1/20* (2013.01); *H04W 24/08* (2013.01); *H04W 84/12* (2013.01)

(58) Field of Classification Search
CPC ... H04W 72/085; H04W 24/08; H04W 84/12; H04L 1/20; H04L 1/0036
See application file for complete search history.

(56) References Cited

U.S. PATENT DOCUMENTS

| 6,111,865 A * | 8/2000 | Butler .................. H04L 1/0017 340/7.42 |
| 2005/0188098 A1* | 8/2005 | Dunk ..................... H04L 67/14 709/232 |
| 2007/0011335 A1 | 1/2007 | Burns et al. |

(Continued)

FOREIGN PATENT DOCUMENTS

| EP | 2445257 A1 | 4/2012 |
| WO | 2015/183378 A1 | 12/2015 |

OTHER PUBLICATIONS

Foley, Michael, "How Bluetooth and 802.11 will team up to deliver high speed wireless connections," EE Times, May 13, 2008, [online], [retrieved on Mar. 4, 2014], retrieved from the internet : <URL: http://www.eetimes.com/document.asp?doc_id=1273551 &print=yes 3/>, 6 pages, pp. 1-8.

(Continued)

*Primary Examiner* — Robert Wilson
(74) *Attorney, Agent, or Firm* — Kilpatrick Townsend & Stockton LLP

(57) ABSTRACT

Devices at either end of a wireless communication link are each configured to support multiple different link settings. During communication, a device that is receiving data can monitor the signal quality and initiate a dynamic transition to a new link setting if performance of the current link setting falls below a lower threshold or exceeds an upper threshold. Dynamic link adaptation can be implemented within a wireless communication interface of the device and can be transparent to application and/or operating system software executing on the device.

21 Claims, 7 Drawing Sheets

(51) Int. Cl.
*H04L 1/00* (2006.01)
*H04W 84/12* (2009.01)

(56) References Cited

U.S. PATENT DOCUMENTS

| | | | |
|---|---|---|---|
| 2008/0310332 A1* | 12/2008 | Hansen | H04W 76/02 370/310 |
| 2009/0221271 A1 | 9/2009 | Soma et al. | |
| 2010/0085975 A1* | 4/2010 | Wang | H04L 69/24 370/395.53 |
| 2010/0128695 A1 | 5/2010 | Nagaraja | |
| 2011/0002344 A1 | 1/2011 | Palin et al. | |
| 2013/0099920 A1* | 4/2013 | Song | G08B 21/023 340/539.13 |
| 2013/0235844 A1 | 9/2013 | Ge et al. | |
| 2013/0286942 A1* | 10/2013 | Bonar | H04B 7/0689 370/328 |
| 2015/0103708 A1 | 4/2015 | Kang et al. | |
| 2015/0350813 A1 | 12/2015 | Prats et al. | |

OTHER PUBLICATIONS

International Search Report and Written Opinion mailed Jun. 22, 2015 in PCT/US2015/020809, 15 pages.

* cited by examiner

DYNAMIC LINK ADAPTATION FOR IMPROVED LINK MARGIN

CROSS-REFERENCE TO RELATED APPLICATIONS

This application claims the benefit of U.S. Provisional Application No. 61/953,591, filed Mar. 14, 2014, titled "Dynamic Link Adaptation for Improved Link Margin," the disclosure of which is incorporated by reference herein in its entirety.

BACKGROUND

The present disclosure relates generally to inter-device communication via a wireless link including dynamic link adaptation for improved link margin.

Wireless communication technologies have proliferated in recent years. For instance, the IEEE 802.11 family of standards defines a wireless network protocol stack that includes MAC-layer and PHY-layer protocols for a variety of data rates. Bluetooth standards, promulgated by Bluetooth SIG, Inc., define MAC and PHY layers and various packet formats to support a variety of data rates for short-range peer-to-peer communication, including Basic Rate (BR), Enhanced Data Rate (EDR), and Low Energy (LE) options. The choice of wireless communication technology for a particular application depends on various considerations, such as throughput requirements and signal strength requirements. In general, higher throughput and higher signal strength are associated with improved performance but at the cost of increased power consumption.

SUMMARY

In certain scenarios, two peer devices, such as a mobile device and a companion device, may communicate a number of different types of data with each other over a wireless link. In addition, such communication may be occurring in an environment in which the signal quality varies with time as the two devices move relative to each other and/or other objects move between them. In order to manage energy consumption without adversely affecting the user experience, it can be desirable to dynamically select the wireless communication technology based on current circumstances of data transmission and signal quality.

Certain embodiments described herein provide dynamic link adaptation. The peer devices at either end of a wireless communication link are each configured to support multiple different link settings, where a link setting can include a combination of a MAC/PHY protocol and a packet format. During communication, a peer device that is receiving data can monitor the signal quality and initiate a transition to a new link setting if the current link setting is deemed "inadequate" for the data communication that is in progress. A link setting can be deemed inadequate, for example, if the signal quality drops below a minimum acceptable level or for other reasons. In some embodiments, a link setting can also be deemed inadequate if the signal quality becomes excessively high, which can be an indication that power is being wasted.

Dynamic link adaptation can be implemented within a wireless communication interface of the device and can be transparent to application and/or operating system software executing on the device. For instance, an application can request a Bluetooth LE link for communication with another device. The wireless communication interface can implement packet format conversions and/or other behaviors as appropriate so that the application "sees" Bluetooth LE behavior regardless of what link setting is actually in use.

The following detailed description together with the accompanying drawings will provide a better understanding of the nature and advantages of the claimed invention.

DETAILED DESCRIPTION

Certain embodiments described herein provide dynamic link adaptation. The peer devices at either end of a wireless communication link are each configured to support multiple different link settings, where a link setting can include a combination of a MAC/PHY protocol and a packet format. During communication, a peer device that is receiving data can monitor the signal quality and initiate a transition to a new link setting if the current link setting becomes inadequate. A link setting can become inadequate, for example, if the signal quality drops below a minimum acceptable level. In some embodiments, a link setting can also become inadequate if the signal quality becomes excessively high, which can be an indication that power is being wasted.

Dynamic link adaptation can be implemented within a wireless communication interface of the device and can be transparent to application and/or operating system software executing on the device. For instance, an application can request a Bluetooth LE link for communication with another device. The wireless communication interface can implement packet format conversions and/or other behaviors as appropriate so that the application "sees" Bluetooth LE behavior regardless of what link setting is actually in use.

Figure 1:
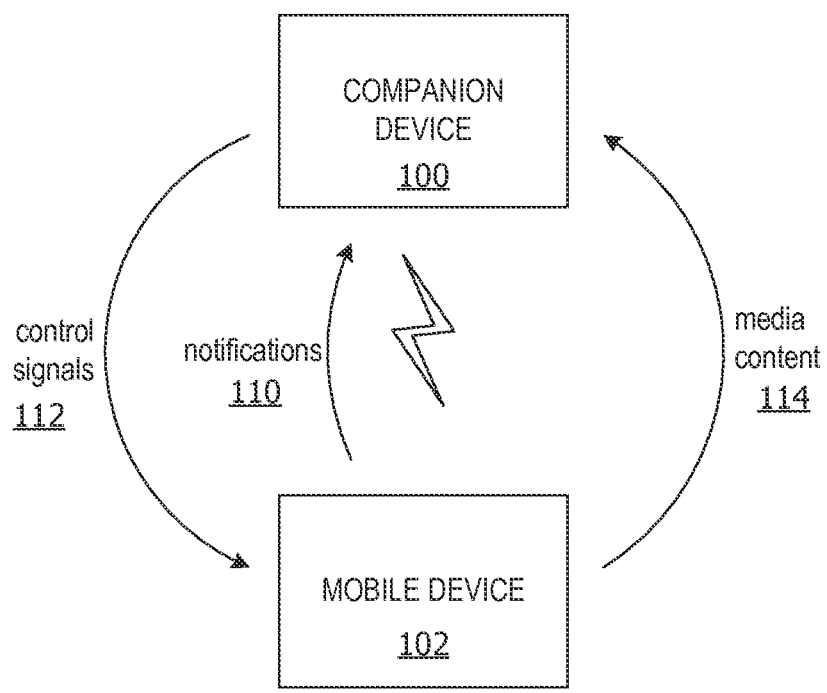
FIG. 1 shows an example of a companion device communicating wirelessly with a mobile device.

FIG. 1 shows an example of a companion device 100 communicating wirelessly with a mobile device 102.

Mobile device 102 can be any device, such as a device that a user might routinely carry from place to place and use in different places. For example, mobile device 102 can be a handheld device, such as a smart phone, a tablet computer, a media player, or any type of mobile phone or other handheld computing and/or communication device. In some embodiments, mobile device 102 can also be a laptop computer or the like.

Companion device 100 can be a device that can communicate wirelessly with mobile device 102, e.g., using protocols such as Bluetooth or Wi-Fi. Such communication can, for example, allow companion device 100 to interoperate with mobile device 102. In some embodiments, companion device 100 can be physically smaller than mobile device 102. For example, companion device 100 can be a wearable device, such as a wrist-worn device, a device that is clipped or pinned to the user's clothing, a device with a lanyard or chain that is wearable around the user's neck, a headband device, eyeglasses, or any other device that can be secured to the user's person or clothing. In some embodiments, companion device 100 can include a touchscreen display that supports user input and user output and an attachment member (e.g., a strap, belt, band, chain, clip, clasp, or the like) that allows companion device 100 to be secured to or otherwise integrated with the user's person or clothing. Other components such as speakers or an audio jack to provide audio output, a microphone to provide audio input, a camera, or the like can be provided. In some embodiments, companion device 100 can also communicate with other host devices that are not necessarily mobile, such as desktop computer systems, point-of-sale terminals, security systems, environmental control systems, and so on.

In operation, companion device 100 and mobile device 102 can interoperate to enhance functionality of mobile device 102 and/or to facilitate user access to functionality provided by mobile device 102. For example, companion device 100 and mobile device 102 can establish a pairing using a wireless communication technology such as Bluetooth and can communicate various types of data to each other via the wireless channel. For example, mobile device 102 can send notifications 110 of selected events (e.g., receiving a phone call, text message, email message, or other information) to companion device 100, and companion device 100 can present corresponding user-perceptible alerts (e.g., textual, image, video, audio, and/or haptic alerts). Companion device 100 can also provide an input interface (e.g., touchscreen, buttons, etc.) via which a user can respond to an alert (e.g., to answer a phone call, reply to a text message, or access other information), and companion device 100 can send responsive control signals 112 to mobile device 102, e.g., to indicate whether the call should be answered or diverted to voicemail. As another example, a user can operate a user interface (e.g., a touchscreen) of companion device 100 to initiate or control an action on mobile device 102, such as unlocking mobile device 102 or turning on its display screen, placing a phone call, or sending a text message, or controlling media playback operations of mobile device 102.

As another example, mobile device 102 can stream media content 114 (e.g., audio data such as a voice mail or music track, or video data) to companion device 100, and companion device 100 can present streamed media content 114 in a user-perceptible form. The user can control media streaming by interacting with the user interface of companion device 100, and companion device 100 can send control signals 112 to mobile device 102, e.g., to select content to be streamed and/or to start or stop streaming.

It will be appreciated that companion device 100 and mobile device 102 are illustrative and that variations and modifications are possible. For example, companion device 100 can be implemented in a variety of articles, including but not limited to wearable articles. In some embodiments, companion device 100 can be operative regardless of whether mobile device 102 is in communication with companion device 100.

In the examples above as well as other use-cases, companion device 100 and mobile device 102 can exchange data of different types using one or more wireless communication channels. To provide a pleasant user experience, the communication should be reliable enough, and latency should be kept low enough, to avoid noticeable disruptions or delays. What constitutes "enough" can depend on the particular interaction. For example, for notifications of certain incoming communications such as email or text messages or calendar alerts, a latency of 20 seconds might not be noticed, while a latency of 20 seconds for real-time interactions, such as audio control media playback, might make using companion device 100 seem unpleasant. Even a shorter latency, such as 5 seconds or even 2 seconds may be unpleasant for some interactions.

A significant contributor to latency can be link drops, where devices 100 and 102 temporarily lose contact with each other, e.g., due to weak signals. Short link drops (e.g., 2 seconds or less) might or might not be problematic for the user, depending on what activity is in progress. Longer link drops can be more problematic, especially if the drop lasts long enough to cause the link to reinitialize, which can include devices 100 and/or 102 rescanning to re-find each other and performing a link initialization sequence. For example, in the case of Bluetooth, a link drop of 20 seconds can result in reinitializing.

The frequency of link drops depends significantly on the link margin of the receiver, where the "link margin" refers to the difference between the minimum signal power that permits reliable data extraction from the signal and the actual received signal power. For a given link, the minimum signal power is approximately constant, so the link margin depends primarily on the actual received signal power. For companion device 100 and mobile device 102, the received signal power can depend strongly on the physical arrangement of companion device 100 and mobile device 102. For example, the user's body can exert a strong blocking effect if it is positioned between companion device 100 and mobile device 102. Such a condition can occur, e.g., if companion device 102 is a wrist-worn device and the user is looking at companion device 102 while mobile device 102 is in the user's back pocket. The blocking effect can be much weaker when the user's body is not positioned between companion device 100 and mobile device 102. Since users frequently move their arms around in the course of daily activity, the link margin for a given link can be strongly and unpredictably time-dependent. As another example, mobile device 102 might be stationary while the user is walking around a room, and this, too, can cause the received signal power and therefore link margin to vary.

This variation might suggest the desirability of using a high-power link so that the link margin remains well above zero under most conditions. However, if companion device 100 and/or mobile device 102 are battery-powered, battery constraints may limit the ability to use a high-power link.

According to certain embodiments, the competing concerns of link margin and energy consumption can be addressed using dynamic link adaptation based on link margin. For example, mobile device 102 and companion device 100 can each support multiple different link settings, where a "link setting" refers to a combination of a MAC/PHY protocol (e.g., Bluetooth LE, Bluetooth BR/EDR, or 802.11 protocols) and a specific packet format (e.g., various Bluetooth packet formats such as 1-DH5 or 1-DM5). For a given type of communication, a communication interface in one of the devices can select an initial link setting, e.g., based on a selection specified by the application or operating system that produces or consumes the data being communicated. If, during operation, the link margin drops below a lower threshold, the communication interface can automatically transition to a higher-power link setting (if one is available). Similarly, if, during operation, the link margin increases above an upper threshold, the communication interface can automatically transition to a lower-power link setting.

In general, a link can be bidirectional and can include an "uplink" path (e.g., data flowing from companion device 100 to mobile phone 102 of FIG. 1) and a "downlink" path (e.g., data flowing from mobile phone 102 to companion device 100). In some embodiments, link settings for the uplink and downlink paths can be dynamically modified independently of each other; there is no requirement that an uplink path and its corresponding downlink path use the same link setting. This can simplify the negotiation of link settings. For instance, the receiver on a path (e.g., mobile phone 102 for the uplink, companion device 100 for the downlink) can select the link setting for that path based at least in part on its received signal quality and can communicate the selection to the transmitter, which can then dynamically switch to using the selected link setting. Independent selection of link settings for the uplink and downlink paths can also help improve link performance in situations where the two devices experience differences in the quality of signal being received, as the selection of a link setting for the uplink need not be constrained by the behavior of the downlink (and vice versa).

Figure 2:
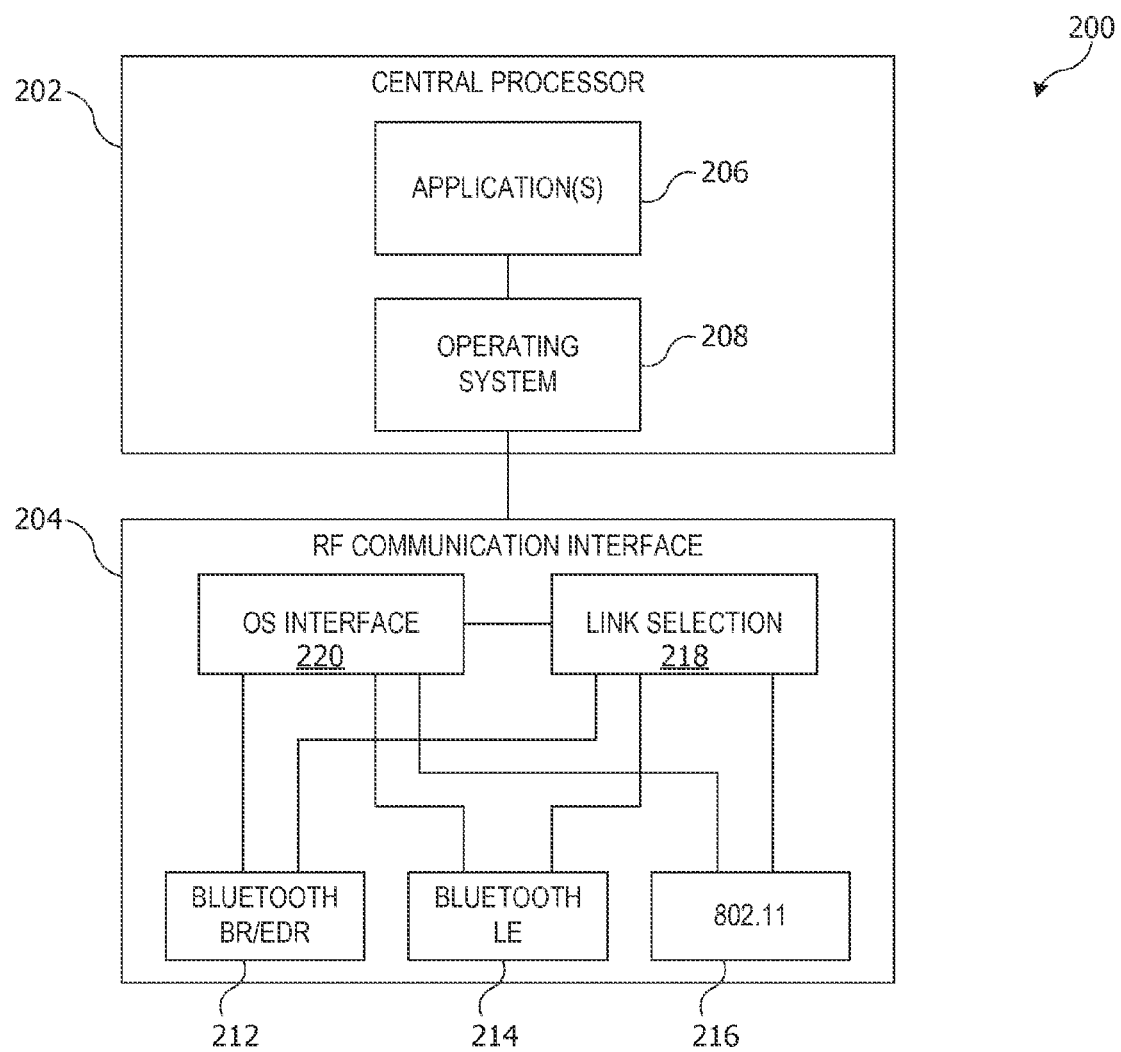
FIG. 2 shows a simplified block diagram of components of an example computing system.

Dynamic link adaptation can be implemented in a variety of computing devices, including either or both of mobile device 102 and companion device 100. FIG. 2 shows a simplified block diagram of components of an example computing system 200 that can be implemented in companion device 100 and/or mobile device 102. Computing system 200 can include a central processor 202 and a radio-frequency (RF) communication interface 204. In some embodiments, computing system 200 can include other components (not shown) such as user interface components (e.g., display, speakers, keyboard, touch screen, touch pad, microphone), sensor devices (e.g., pressure sensors, acceleration sensors, directional sensors, ambient light sensors), telephony components (e.g., cellular voice and/or data network transceiver), camera components, power components (e.g., battery, power management circuitry, battery-charging circuitry) and so on.

Central processor 202, which can be of generally conventional design and can include one or more processor chips, can execute software such as one or more applications 206 and operating system 208. Applications 206 can facilitate user interaction with computing system 200 to perform operations such as placing or receiving phone calls, reading or composing various kinds of messages (e.g., text messages, email messages), playing media content, and so on. Operating system 208 can implement services and functionality to support applications 206, including an application program interface to allow applications 206 to invoke communication functions of computer system 200.

RF communication interface 204 can be implemented in one or more integrated circuits, which can include fixed-function circuits or programmable logic circuits controlled by firmware instructions that can be stored in memory within or local to RF communication interface 204. RF communication interface 204 can include radio circuit components (e.g., oscillators, modulators, demodulators, amplifiers, antennas) that physically enable transmission and reception of data-carrying RF signals.

Multiple RF communication channels or MAC/PHY protocols can be supported by providing a transceiver module for each channel. For example, shown in FIG. 2 are a Bluetooth BR/EDR transceiver module 212, a Bluetooth LE transceiver module 214, and an 802.11 transceiver module 216. Bluetooth BR/EDR transceiver module 212 can support basic-rate and enhanced data rate communications conforming to the standards promulgated by Bluetooth SIG, Inc. Bluetooth LE transceiver module 214 can support communications conforming to the Bluetooth Low Energy standards promulgated by Bluetooth SIG, Inc. 802.11 transceiver module 216 can support communications conforming to various IEEE 802.11 family standards, including 802.11a, 802.11b, 802.11e, 802.11g, 802.11n, 802.11ac, 802.11ad, and/or 802.1 lax; in some embodiments, these communications can conform to Wi-Fi certification standards established by the Wi-Fi Alliance. Other protocols can also be supported. In some embodiments, different ones of transceiver modules 212, 214, and 216 can share some or all of their hardware elements (e.g., antennas, oscillators, amplifiers), and communications using different transceiver modules can be multiplexed to allow multiple channels to be in use concurrently. In some embodiments, RF communication interface 204 can include different or additional RF communication modules to support other communication channels or MAC/PHY protocols, in addition to or instead of the examples shown.

RF communication interface 204 can also include a link selection module 218, which can be implemented using fixed-function circuitry, programmable logic circuits executing firmware, or the like. Link selection module 218 can determine which of transceiver modules 212, 214, 216 should be used in connection with particular transmissions and can also select among packet formats for a given transceiver. For example, link selection module 218 can implement dynamic link adaptation using various logic processes described below.

Operating system (OS) interface module 220 can facilitate communication between operating system 208 and other components of RF communication interface 204. For example, OS interface module 220 can convert data received from operating system 208 to a format for transmission based on a current link setting selected by link selection module 218. OS interface module 220 can also convert data received at transmission modules 212, 214, 216 to a format expected by operating system 208.

In some embodiments, OS interface module 220 can render the dynamic link adaptation transparent to processes executing in central processor 202, such as operating system 208 and applications 206. For example, one or more applications 206 (or operating system 208) can request a Bluetooth LE link, and communication interface 204 can begin communicating using Bluetooth LE transceiver module 214. If the performance of the Bluetooth LE link falls below a lower threshold or exceeds an upper threshold, link selection module 218 can transition to a different transceiver module and/or packet format (e.g., Bluetooth 1-DM5 supported by Bluetooth BR/EDR transceiver module 212). To the extent that application 206 (or operating system 208) delivers data in a format specific to Bluetooth LE, OS interface module 220 can convert the format based on the link setting actually in use (e.g., Bluetooth BR/EDR transceiver module 212 rather than Bluetooth LE transceiver module 214). Similarly, to the extent that application 206 (or operating system 208) expects to receive data in a format specific to Bluetooth LE, OS interface module 220 can convert any data received in a different format to match this expectation. Thus, application 206 and operating system 208 need not be aware that dynamic link adaptation is occurring at all or of which link setting is currently in use.

It will be appreciated that computer system 200 is illustrative and that variations and modifications are possible. For example, in various embodiments, computer system 200 can include any combination of any or all of the components described above, as well as other components not expressly described. For example, in some embodiments, a user interface can include, e.g., any or all of a touchscreen, a speaker, a haptic device, a keyboard, a keypad, and so on. Some devices can include wired data interfaces (e.g., USB port, Ethernet port) in addition to an RF communication interface. A wired power connection, e.g., for supplying operating power to the device and/or charging a battery of the device, can be provided separately from any data connection, or inductive (wireless) charging can be used.

Further, while computer system 200 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. A variety of apparatus can be used, including electronic devices implemented using any combination of circuitry and software. It is also not required that every block shown in FIG. 2 be implemented in a given embodiment.

Figure 3:
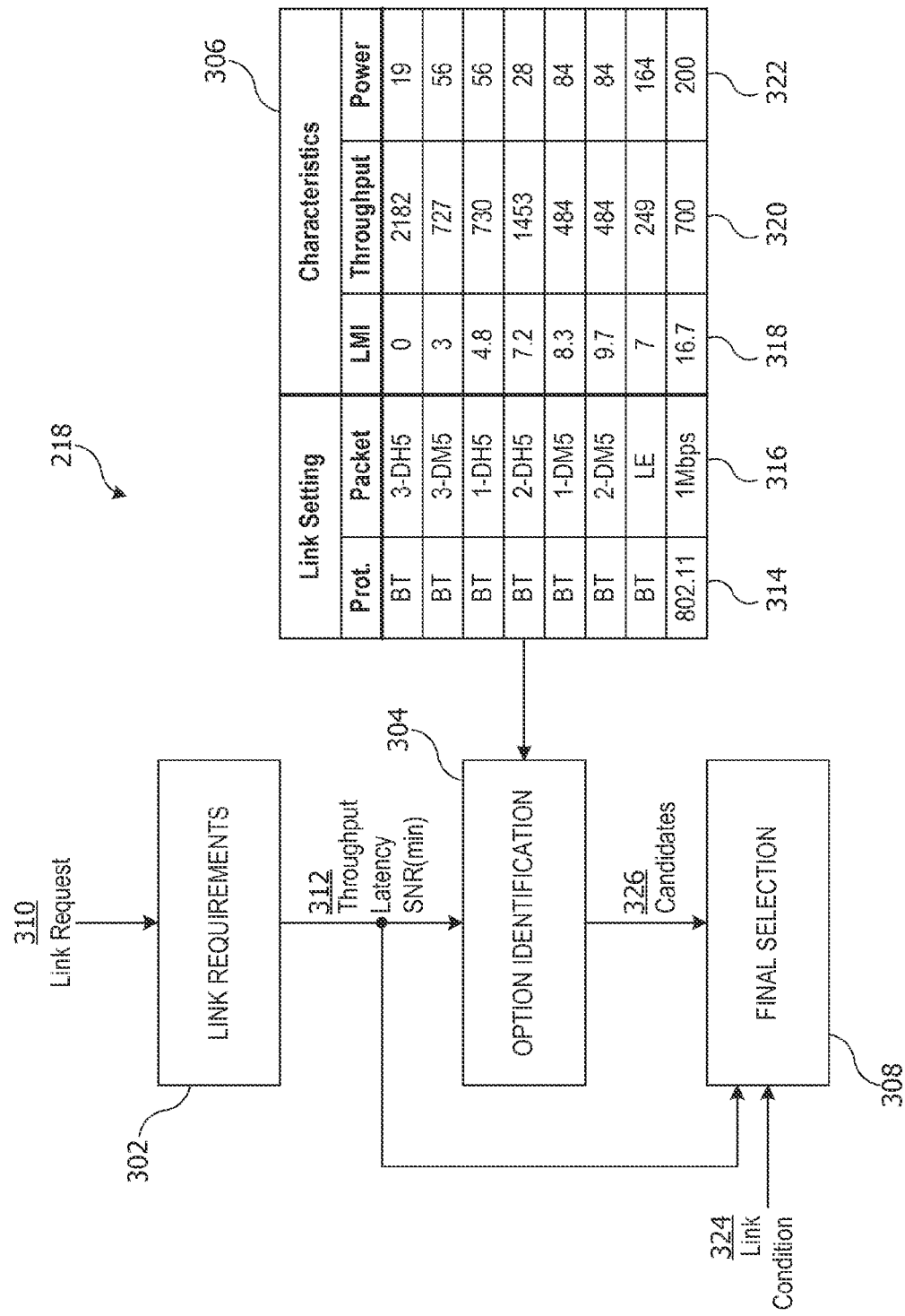
FIG. 3 shows a simplified block diagram of an example link selection module.

FIG. 3 shows a simplified block diagram of an example implementation of link selection module 218 of FIG. 2. Link selection module 218 can select a link to be used for communication based on a combination of information about what type of link a software component (e.g., application 206 or operating system 208 of FIG. 2) has requested and information about the current link condition. Link selection module 218 can include a link requirements module 302, an option identification module 304 that can use a link properties data table 306, and a final selection module 308. These components can be implemented, e.g., in firmware installed for an RF communications interface processor.

In operation, link requirements module 302 can receive a link request 310 to establish a communication link. Link request 310 can be received from a software component such as operating system 208 or application 206 of FIG. 2. In some embodiments, link request 310 can specify a particular MAC/PHY protocol (e.g., Bluetooth, 802.11) and data rate (or packet type) for the link. In other embodiments, link request 310 can provide other information usable to determine required or desired properties of the link. For example, link request 310 might specify the type of data to be exchanged on the link (e.g., control, notifications, media) or specific performance targets (e.g., throughput and/or latency).

In response to link request 310, link requirements module 302 can determine requirements 312 for the link, such as a throughput, latency, and minimum signal-to-noise ratio (SNR). For instance, if link request 310 specifies a particular MAC/PHY protocol and data rate, link requirements 312 can be determined based on established performance characteristics of the protocol and data rate.

Option identification module 304 can receive link requirements 312 and identify available link settings that satisfy link requirements 312. For example, options identification module 304 can maintain link properties data table 306, which provides performance information about each available link setting. As used herein, a link setting can be defined by a combination of a MAC/PHY protocol (column 314 in table 306) and a packet format (column 316). Packet formats can include standard formats such as Bluetooth 1-DH5 and Bluetooth 1-DM5. In some embodiments, packet formats can also include nonstandard formats. For instance, "3-DM5" can refer to a Bluetooth-compatible packet format using 8-DQPSK modulation and FEC 1/3 forward error correction; similarly, "2-DM5" can refer to a Bluetooth-compatible packet format using GFSK modulation and FEC 1/3 forward error correction. In some embodiments, specifying a link setting can include additional parameters in addition to or instead of MAC/PHY protocol and packet format.

For each link setting, the information in table 306 can include performance characteristics such as link margin improvement (LMI) score, throughput, and power consumption. An LMI score (column 318) for a link setting can indicate the expected improvement (e.g., in decibels) in link margin to be obtained by switching to that link setting from a baseline or reference link setting. In this example, Bluetooth 3-DH5 can be the baseline, and all other link settings show relative improvement in link margin. The selection of the baseline is arbitrary, and the LMI score can be allowed to take negative values if a link margin decreases upon switching from the baseline to the other link setting. Throughput (column 318) can indicate the maximum throughput provided by the link setting, e.g., in kilobits per second (kbps). Power consumption (column 322) can reflect the average power consumed to transmit a bit using the link setting, e.g., in microwatts per bit ($\mu$W/b).

In some embodiments, option identification module 304 can receive link requirements 312 specifying a throughput, latency, and minimum SNR. Option identification module 304 can use table 306 to identify all link settings that meet requirements 312 as candidates 326.

Final selection of a link setting can be made using final selection module 308. In some embodiments, final selection module 308 can make a first selection at the outset of communication (e.g., based on a link setting specified in link request 310) and dynamically update the selection based on a current link condition 324. For example, current link condition 324 can represent the current link margin or SNR. In some embodiments, current link condition 324 can be determined based on signals received by whichever of transceiver modules 212, 214, 216 of FIG. 2 is currently in use. Any type of signal quality measurement, including known techniques, can be used to determine current link condition 324.

Final selection module 308 can select the link setting to be used based on candidates 326 identified by option identification module 304, link requirements 312, and link condition 324. For example, if link condition 324 indicates that the signal quality is poor, final selection module 308 can "upgrade" to a link setting with an improved link margin relative to the current link setting, which can be determined by comparing the LMI scores from column 318 of table 306. If link condition 324 indicates that the signal quality is good, final selection module 308 can maintain the current selection or in some instances "downgrade" to a link setting with higher energy efficiency (lower power consumption in column 322 of table 306) that still meets link requirements 312.

Figure 4:
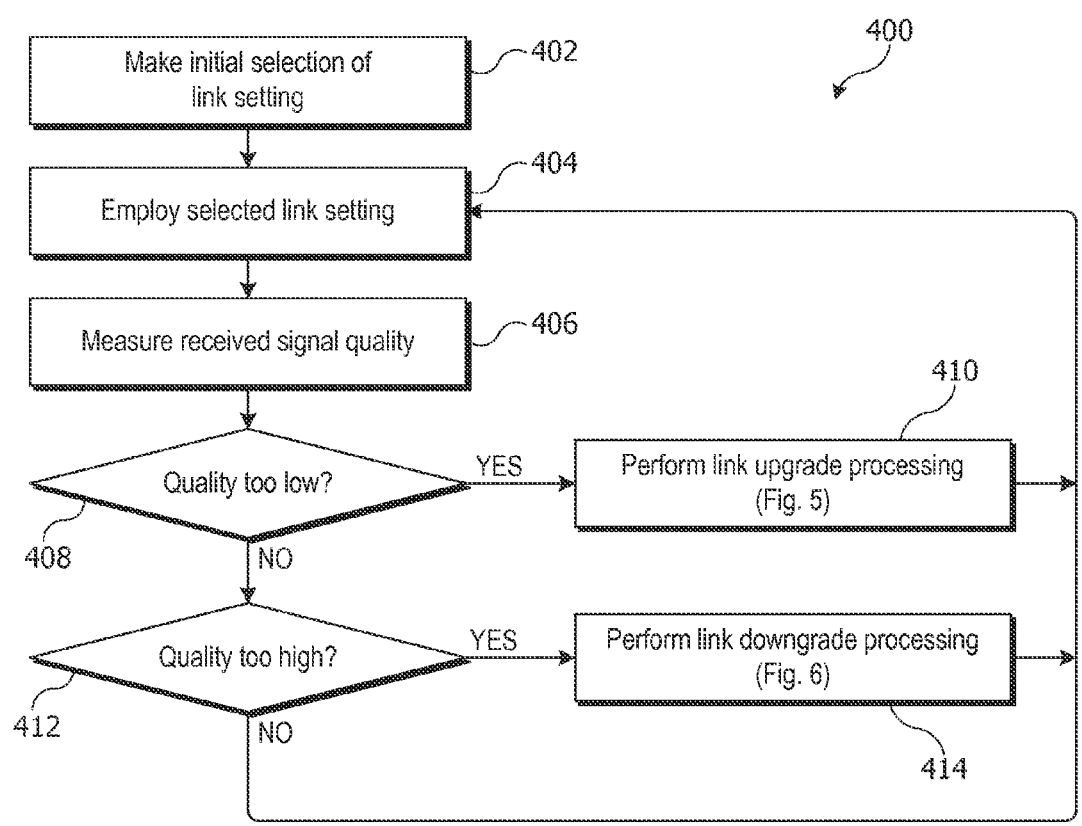
FIG. 4 is a flow diagram of an example link-setting selection process.
Figure 5:
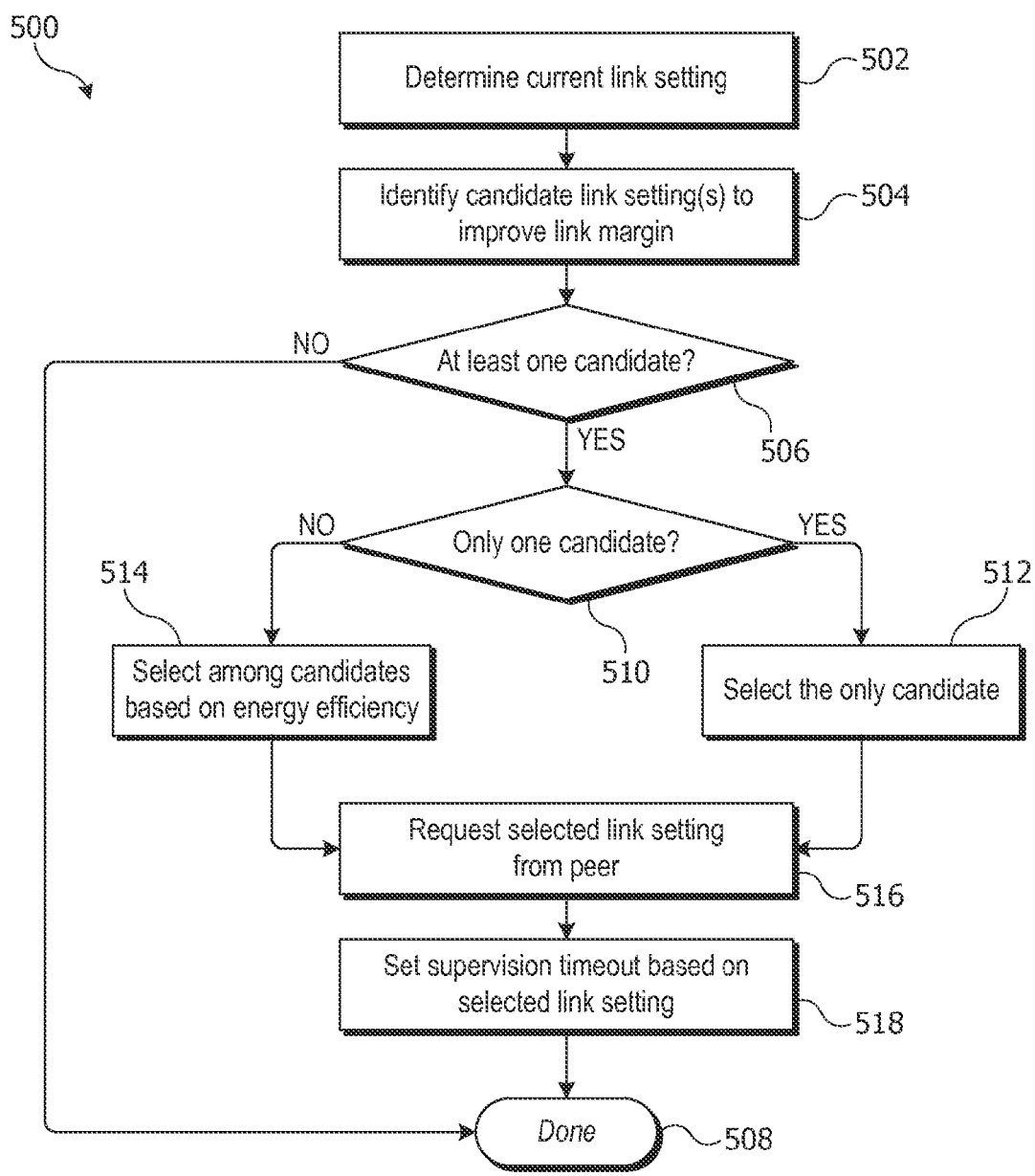
FIG. 5 is a flow diagram of an example process for link upgrade processing.
Figure 6:
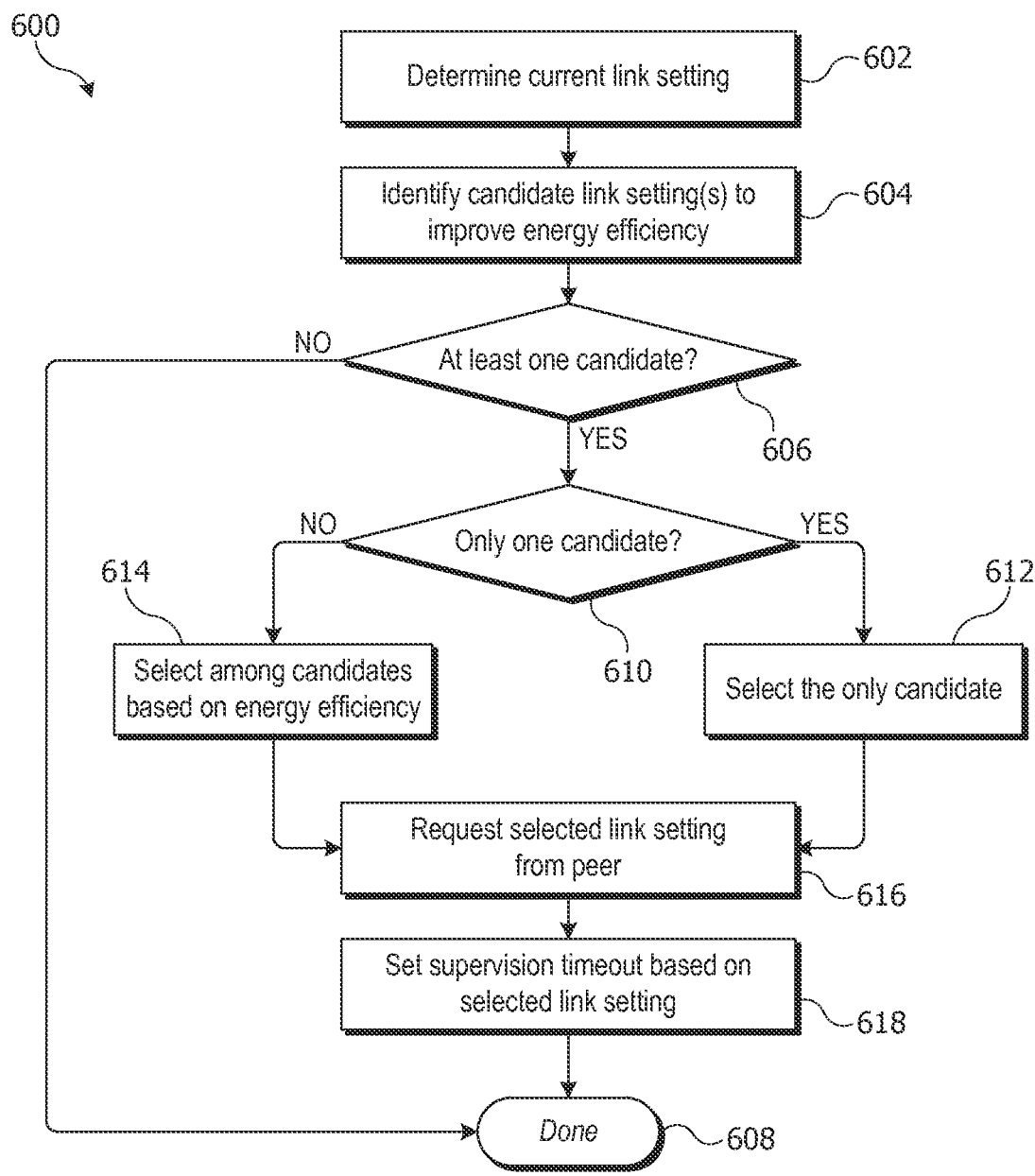
FIG. 6 is a flow diagram of an example process for link downgrade processing.

FIGS. 4-6 are flow diagrams showing specific examples of selection logic that can be implemented in link selection module 218 of FIG. 2 to select a link setting for data to be received by computer system 200 or by a particular process executing thereon. It is to be understood that these processes can be implemented in each of companion device 100 and mobile phone 102, allowing link settings for the downlink and uplink paths to be independently and dynamically adjusted.

Referring first to FIG. 4, there is shown an example link-setting selection process 400. At block 402, an initial link setting can be selected. For example, in the implementation of FIG. 3, if link request 310 specifies a particular link setting, that link setting can be initially selected. If link request 310 specifies desired behavior of the link (e.g., link requirements 312), table 306 or other link-property data can be used to identify a link setting that provides (or exceeds) the specified behavior; in some embodiments, the highest-efficiency link setting that provides the specified behavior can be selected.

At block 404, the selected link setting can be employed to receive data. At block 406, the received signal quality (e.g., SNR) can be measured. Signal quality measurement can occur periodically while data is being transferred (e.g., once per second, once per half second, every 500 microseconds, or at some other interval). Conventional techniques for quantifying received signal quality can be used.

At block 408, process 400 can determine whether the signal quality is "too low," e.g., a link quality low enough that it may adversely affect the user experience. In some embodiments, the determination can include comparing a measurement of link quality to a lower threshold. For instance, the determination can include comparing a measured SNR to a minimum SNR (SNR(min)) determined by link requirements module 302 of FIG. 3. A hysteresis offset can be applied to prevent small fluctuations from resulting in frequent changing of the link setting. Thus, in one embodiment the comparison can be between measured SNR and SNR(min)–$H_1$, where $H_1$ is a hysteresis offset that can be time-dependent (e.g., a function of how long the current link setting has been in use). If the SNR is too low, then at block 410, process 400 can perform link upgrade processing.

Referring to FIG. 5, there is shown an example of a process 500 for link upgrade processing that can be performed at block 410 of process 400. At block 502, process 500 can determine the current link setting (e.g., MAC/PHY protocol and packet format as described above). At block 504, process 500 can identify one or more candidate link settings that would be expected to improve the link margin. For instance, in the implementation of FIG. 3, candidate link settings can be identified by option identification module 304 using table 306. Depending on the particular situation, zero, one, or more than one candidate may be identified.

At block 506, if no candidate link settings are identified, process 500 can end (block 508). In this case, the link setting is unchanged.

If, at block 506, at least one candidate link setting is identified, then process 500 can proceed to block 510. If, at block 510, only one candidate link setting is identified, then that candidate link setting can be selected at block 512. If, at block 510, multiple candidate link settings are identified, then at block 514, process 500 can select among the candidates. In some embodiments, selection can be based on energy efficiency, with the most efficient candidate link setting being chosen. This selection policy can lead to conservative upgrading of the link that tends to result in selecting the most energy-efficient link setting capable of providing the required performance. However, other selection policies can also be implemented.

At block 516, process 500 can request that the peer device (i.e., the device at the other end of the link) switch its link setting to the link setting selected at block 512 or block 514. At block 518, process 500 can set a supervision timeout based on the selected link setting. As used herein, a "supervision timeout" refers to a maximum period that the receiving device on a link path allows to elapse without receiving a signal from the transmitting device; if the supervision timeout period expires without a signal, the receiving device goes into an unlinked state, from which it has to re-find the peer and re-establish a link before further data communication can occur. Such an event can lead to noticeable latency. Some wireless communication standards specify a supervision timeout; for example, Bluetooth BR/EDR specifies a timeout of 20 seconds. In some embodiments, process 500 can set a longer-than-standard supervisor timeout, which can improve stability of the link.

After requesting the new link setting, process 500 can end at block 508.

Referring again to FIG. 4, if, at block 408, it is determined the signal quality is not too low, then at block 412, process 400 can determine whether the signal quality is "too high," e.g., a link quality indicating that the link may be consuming more power than is necessary for successful and reliable data transfer. In some embodiments, the determination can include comparing a measurement of link quality (which can be the same measurement used at block 408) to an upper threshold. For instance, the determination can include comparing the measured SNR to a maximum SNR. The maximum SNR (SNR(max)) can be defined as desired, e.g., based on SNR(min) and a margin (e.g., percentage of SNR(min) or decibel value added to SNR(min)). As at block 408, a hysteresis offset can be applied to prevent small fluctuations in signal quality from resulting in frequent changing of the link setting. Thus, in one embodiment the comparison can be between measured SNR and SNR(max)+$H_2$, where $H_2$ is a hysteresis offset that can be the same as or different from $H_1$; like $H_1$, $H_2$ can be time-dependent (e.g., a function of how long the current link setting has been in use). If the measured SNR is above the maximum quality threshold, then at block 414, process 400 can perform link downgrade processing.

Referring to FIG. 6, there is shown an example of a process 600 for link downgrade processing that can be performed at block 414 of process 400. At block 602, process 600 can determine the current link setting (e.g., MAC/PHY protocol and packet format as described above). At block 604, process 600 can identify one or more candidate link settings that would be expected to improve the energy efficiency. (In some cases, these settings may degrade the link margin.) For instance, in the implementation of FIG. 3, candidate link settings can be identified by option identification module 304 using table 306, with the candidate link settings being limited to those options that meet link requirements 312 and have lower energy consumption per bit than the current link setting. Depending on the particular situation, zero, one, or more than one candidate may be identified.

At block 606, if no candidate link settings are identified, process 600 can end (block 608). In this case, the link setting is unchanged.

If, at block 606, at least one candidate link setting is identified, then process 600 can proceed to block 610. If, at block 610, only one candidate link setting is identified, then that candidate link setting can be selected at block 612. If, at block 610, multiple candidate link settings are identified, then at block 614, process 600 can select among the candidates. In some embodiments, selection can be based on energy efficiency, with the most efficient candidate link setting being chosen. This selection policy can lead to aggressive downgrading of the link that can result in selecting the most energy-efficient link setting capable of providing the required performance. However, other selection policies can also be implemented.

At block 616, process 600 can request that the peer device (i.e., the device at the other end of the link) switch its link setting to the link setting selected at block 612 or block 614. At block 618, process 600 can set a supervision timeout based on the selected link setting, similarly to block 518 of process 500 described above. Thereafter, process 600 can end at block 608.

Referring again to FIG. 4, link upgrade processing at block 410 or link downgrade processing at block 414 can (but need not) result in a change in the selected link setting. In any case, process 400 can return to block 404 to continue data communication using the selected link setting. Process 400 can continue as long as the link persists, which can be for as long as the devices continue to communicate data. Process 400 can start over at block 402 if communication is interrupted (e.g., if a link is lost).

Figure 7:
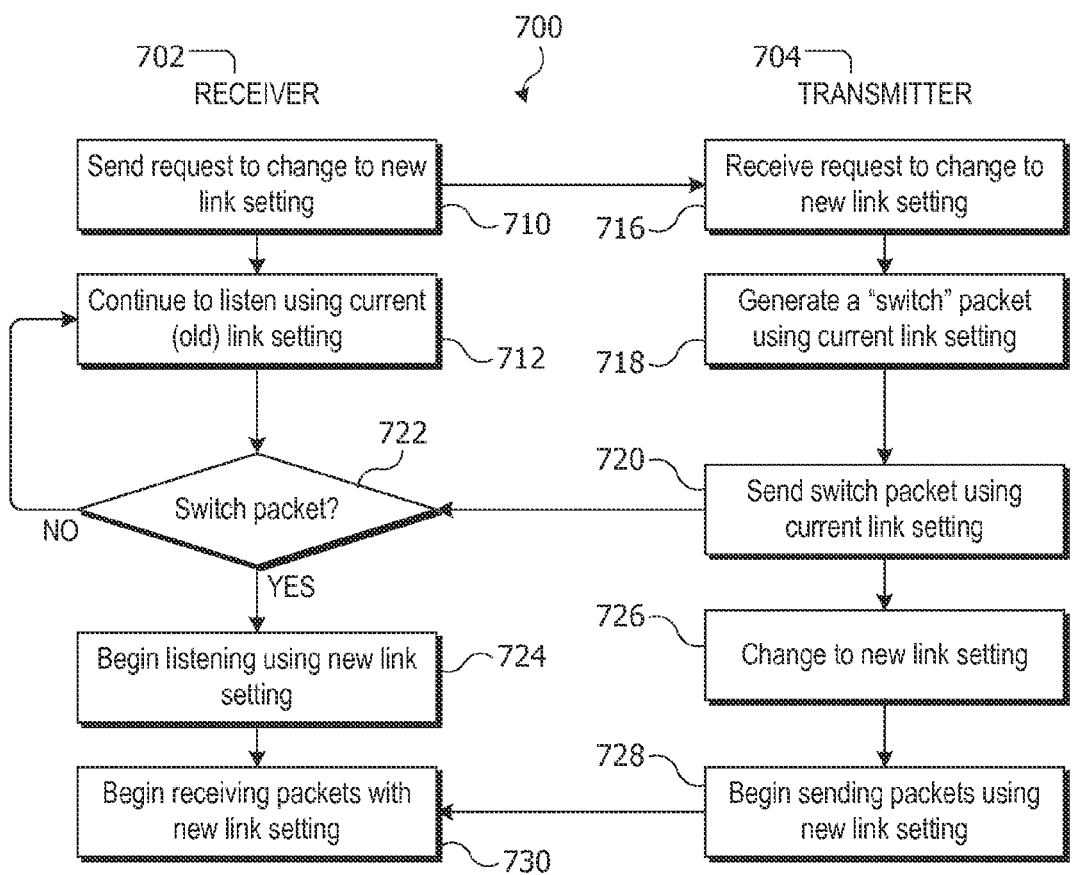
FIG. 7 is a flow diagram of an example process for transitioning to a new link setting.

Using processes 400, 500 and 600 (or similar processes), it is possible to monitor the signal quality and dynamically adapt the link setting in real time, e.g., based on the signal quality. This can reduce the occurrence of link drop events and maintain latency and throughput at levels that provide a satisfactory user experience. At the same time, the ability to downgrade a link when the signal is particularly strong can allow for conservation of device power. The combination of a conservative link-upgrade policy and an aggressive link-downgrade policy can result in selecting the most energy-efficient link setting that is capable of meeting the link requirements given current signal attenuation behavior. This can allow energy consumption to be reduced without adversely affecting the user experience, To avoid disruption in the user experience, the transition between link settings can be made seamlessly and with little overhead. For example, FIG. 7 is a flow diagram of an example process 700 for transitioning to a new link setting. Process 700 can be performed in part by a receiver 702 and in part by a transmitter 704. It is assumed that receiver 702 has selected a new link setting, e.g., using process 500 of FIG. 5 or process 600 of FIG. 6.

Process 700 can begin at block 710, where receiver 702 can send a request to transmitter 704 to change a link setting. In some embodiments, block 710 can correspond to block 516 of FIG. 5 or block 616 of FIG. 6. The request can be sent using a control link setting that is currently assigned to a control link path from receiver 702 to transmitter 704. (This control link path is in the reverse direction from the link path affected by process 700.) After sending the request, receiver 702 can continue to listen for data using the current link settings at block 712, and any received data packets can be processed in the usual manner. In the meantime, at block 716, transmitter 704 can receive the request to change the link setting. At block 718, transmitter 704 can generate a "switch" packet using the current link setting. The particular format and/or content of the switch packet can be based on the current link setting; any format and/or content can be used, provided that receiver 702 is capable of recognizing the switch packet as a switch packet. The switch packet can communicate to receiver 702 that transmitter 704 is switching to the new link setting, and at block 720, the switch packet can be the last packet sent by transmitter 704 using the current link setting.

In the meantime, at block 722, receiver 702 can continue listening for data using the current link setting (block 712) until the switch packet is detected. After detecting the switch packet, receiver 702 can begin listening for data using the new link setting at block 724.

After sending the switch packet at block 720, transmitter 704 can change to the new link setting at block 726, and at block 728, transmitter 704 can begin generating and sending packets using the new link setting. At block 730, receiver 702 can begin receiving packets with the new link setting, and the transition can be complete. In some embodiments, receiver 702 can power down RF circuitry that is not being used; accordingly, after the transition to the new link setting, receiver 702 can power down RF circuitry used for the old link setting but not for the new link setting. For example, if the link setting changes from 802.11 to Bluetooth, receiver 702 might power down an 802.11 receiver circuit. Although not shown in FIG. 7, it is to be understood that sending and receiving of packets with the new link settings can continue until receiver 702 determines that the link setting should be changed again or until the link ends.

It will be appreciated that the process described above are illustrative and that variations and modifications are possible. Steps described as sequential may be executed in parallel, order of steps may be varied, and steps may be modified, combined, added or omitted. For example, process 700 can include additional confirmation actions to make sure that all packets sent with the old link settings were received before the new link settings are applied. In addition, other processes can be used to effect the transition. For example, the transmitter can indicate when the transition occurs using a flag inside a data-containing packet sent on the old link rather than a separate switch packet. Further, in some embodiments, the receiver can listen for data using multiple link settings at the same time, including both the old and new link settings. In such embodiments, after sending a request to change the link setting, the receiver can listen using both the old and new link settings until data begins to be received using the new link setting, after which the receiver can discontinue listening using the old link setting, and it is not necessary for the transmitter to provide a switch packet or other explicit indicator to mark the transition.

In some embodiments, selection of link settings in processes 500 and 600 can take into account capabilities of the peer. For instance, it is possible that the peer may not support every link setting supported by the device making the selection, and the selection can be limited to link settings that are also supported by the peer. Determination of which link settings the peer can support can occur, for example, during initial configuration of the devices for communication (e.g., during a pairing or link initialization process where the devices exchange information about their capabilities).

The processes described above (or similar processes) can be implemented in the devices at both ends of a link, allowing link settings for the uplink and downlink paths to be independently selected based on the link conditions as experienced by the receiving device in each instance. Accordingly, it is not necessary for the two devices to negotiate a bidirectional change in link setting. Instead, the receiver can unilaterally request a change in its link setting, and the transmitter can implement the change upon request. Thus, it is possible for the uplink and downlink to be using different settings or the same settings at any given time.

In some embodiments, dynamic link adaptation is employed only in instances where both devices support the behavior. A device that supports dynamic link adaptation can be interoperable with a device that does not. For example, a device can indicate its ability to support dynamic link adaptation when the devices initially connect, e.g., during an initial pairing process or other process in which the devices exchange information about their identity and capabilities. If a first device (e.g., a companion device) that supports dynamic link adaptation determines that it is paired with a peer (e.g., a mobile device) that does not support dynamic link adaptation, the first device can simply disable dynamic link adaptation and use static link settings while communicating with that peer.

Although embodiments described above refer to a single link between devices with one uplink path and one downlink path, some embodiments may support multiple simultaneous links between the same two devices (e.g., for communicating different types of data). Where this is the case, link settings and supervision timeout for each link can be selected independently based on the requirements of the particular link. In some embodiments, hardware capability or other constraints may weigh in favor of multiplexing multiple logical links onto the same physical link infrastructure, and in that case, the logical link with the most demanding requirements can be used to select a link setting.

Various features described herein, e.g., methods, apparatus, computer-readable media and the like, can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features described herein may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

While the foregoing description makes reference to specific embodiments, one skilled in the art will recognize that numerous modifications are possible. Thus, it will be appreciated that the invention is intended to cover all modifications and equivalents within the scope of the following claims.

What is claimed is:

1. A method implemented in a wireless communication interface processor of a first device, the method comprising:
   receiving a data signal from a second device using a first link setting selected from a plurality of supported link settings;
   determining a signal quality of the received data signal, the signal quality including a received signal power, wherein the first link setting has a first minimum signal power required for the first link setting and is associated with a first link margin defined by a first difference between the first minimum signal power and the received signal power;
   determining whether the signal quality is below a lower threshold; and
   in the event that the signal quality is below the lower threshold:
   selecting a second link setting from the plurality of supported link settings, wherein the second link setting has a second minimum signal power required for the second link setting and is associated with a second link margin defined by a second difference between the second minimum signal power and the received signal power, and wherein the second link margin is greater than the first link margin; and
   switching to the second link setting to receive a subsequent data signal from the second device.

2. The method of claim 1 further comprising:
   determining whether the signal quality is above an upper threshold; and
   in the event that the signal quality is above the upper threshold:
   selecting a third link setting from the plurality of supported link settings, the third link setting having a higher energy efficiency than the first link setting; and
   switching to the third link setting to receive a subsequent data signal from the second device.

3. The method of claim 1 wherein switching to the second link setting includes sending a request to the second device to begin transmitting data using the second link setting.

4. The method of claim 1 further comprising:
   determining a link requirement for receiving the data signal; and
   selecting the first link setting based at least in part on the link requirement.

5. The method of claim 4 wherein the second link setting is selected based at least in part on the link requirement.

6. The method of claim 1 wherein each of the plurality of link settings specifies a particular one of a plurality of supported medium access control layer (MAC)/physical layer (PHY) protocols and a particular one of a plurality of packet formats.

7. The method of claim 6 wherein at least two of the plurality of link settings specify a same one of the MAC/PHY protocols and different ones of the packet formats.

8. The method of claim 1 wherein the signal quality includes a signal-to-noise ratio.

9. The method of claim 1 wherein switching to the second link setting includes changing a supervision timeout period for the link.

10. The method of claim 1, wherein the data signal and the subsequent data signal are transmitted as part of a same data communication that is in progress between the first device and the second device.

11. The method of claim 1, wherein the second link setting acts as a downlink path between the second device and the first device, the method further comprising:
   transmitting an uplink data signal to the second device using a third link setting that acts as an uplink path between the first device and the second device, wherein the third link setting is different than the second link setting, wherein link settings for the uplink path and the downlink path can be selected independently.

12. A method implemented in a wireless communication interface processor of a first device, the method comprising:
   determining a signal quality associated with a received signal from a second device, the signal being received using a first link setting selected from a plurality of supported link settings;
   determining whether the signal quality is above an upper threshold;

in the event that the signal quality is above the upper threshold, selecting a second link setting from the plurality of supported link settings, the second link setting having a higher energy efficiency than the first link setting; and switching to the second link setting to receive a subsequent signal from the second device.

13. The method of claim 12 further comprising:

determining a link requirement for receiving the data; and selecting the first link setting based at least in part on the link requirement.

14. The method of claim 13 wherein the second link setting is selected based at least in part on the link requirement.

15. The method of claim 12 wherein each of the plurality of link settings specifies a particular one of a plurality of supported medium access control layer (MAC)/physical layer (PHY) protocols and a particular one of a plurality of packet formats.

16. The method of claim 15 wherein at least two of the link settings specify a same one of the MAC/PHY protocols and different ones of the packet formats.

17. A non-transitory computer readable storage medium storing instructions that, when executed by one or more processors, cause the one or more processors to:

communicate with an operating system of a computing device and to receive a request to establish a link to a peer device;

determine a link requirement for receiving data via the link to the peer device;

identify one or more candidate link settings from a plurality of supported link settings, wherein each of the candidate link settings meets the link requirement; and dynamically select an operative link setting from among the candidate link settings based at least in part on a measured signal quality of a signal received via the link to the peer device.

18. The non-transitory computer readable storage medium of claim 17, further comprising instructions that when executed cause the one or more processors to dynamically select, as the operative link setting, a most energy-efficient one of the candidate link settings that is capable of meeting the link requirement given the measured signal quality.

19. The non-transitory computer readable storage medium of claim 17, further comprising instructions that when executed cause the one or more processors to upgrade the operative link setting when the measured signal quality is below a low threshold and to downgrade the operative link setting when the measured signal quality is above a high threshold.

20. The non-transitory computer readable storage medium of claim 17 wherein each of the plurality of link settings specifies a particular one of a plurality of supported medium access control layer (MAC)/physical layer (PHY) protocols and a particular one of a plurality of packet formats.

21. The non-transitory computer readable storage medium of claim 17, further comprising instructions that when executed cause the one or more processors to convert data between a first format corresponding to the operative link setting and a second format expected by the operating system of the computing device.

* * * * *